(12) United States Patent
Daniels et al.

(10) Patent No.: US 8,116,503 B2
(45) Date of Patent: Feb. 14, 2012

(54) BEND SWITCH FOR WIRED HEADSET

(75) Inventors: Eric B. Daniels, Los Gatos, CA (US); M. Evans Hankey, San Francisco, CA (US); Daniele De Iuliis, San Francisco, CA (US); Shin Nishibori, San Francisco, CA (US); Peter Russell-Clarke, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 1394 days.

(21) Appl. No.: 11/650,001

(22) Filed: Jan. 5, 2007

(65) Prior Publication Data
US 2008/0165986 A1 Jul. 10, 2008

(51) Int. Cl.
*H04R 25/00* (2006.01)
*H01H 1/12* (2006.01)
*H01H 1/40* (2006.01)
*H01H 3/32* (2006.01)
*H01R 9/05* (2006.01)

(52) U.S. Cl. ........ 381/384; 381/370; 381/374; 200/504; 200/506; 200/508; 439/578

(58) Field of Classification Search .................. 381/370, 381/374, 384; 200/61.19, 504, 506, 508; 439/8, 32, 376, 578, 580, 582, 783
See application file for complete search history.

(56) References Cited

U.S. PATENT DOCUMENTS

2004/0037051 A1* 2/2004 Hagiwara et al. ............. 361/749
2006/0285715 A1* 12/2006 Drambarean et al. ........ 381/380

\* cited by examiner

*Primary Examiner* — Davetta W Goins
*Assistant Examiner* — Matthew Eason
(74) *Attorney, Agent, or Firm* — Kramer Levin Naftalis & Frankel LLP

(57) ABSTRACT

This is directed to a bend switch constructed from two substantially co-linear elongated bodies having opposing contact surfaces. In an open switch position, the contact surfaces remain apart, preventing electrical coupling. To close the switch, a user can bend the elongated bodies relative to each other to cause the contact surfaces to meet, thus creating an electrical coupling. Each elongated body can have several independent conductive portions. The bend switch can include a movable space member placed between the elongated bodies to maintain the contact surfaces a predetermined distance apart in the open switch position. The movable space member can include preferred or non-preferred bending orientations, equilibrium positions, and/or a potentiometer for closing the switch. The bend switch can control one or more functions (e.g., microphone, volume, or playback controls) of an electronic device (e.g., portable media device or cellular telephone) coupled to the bend switch.

30 Claims, 7 Drawing Sheets

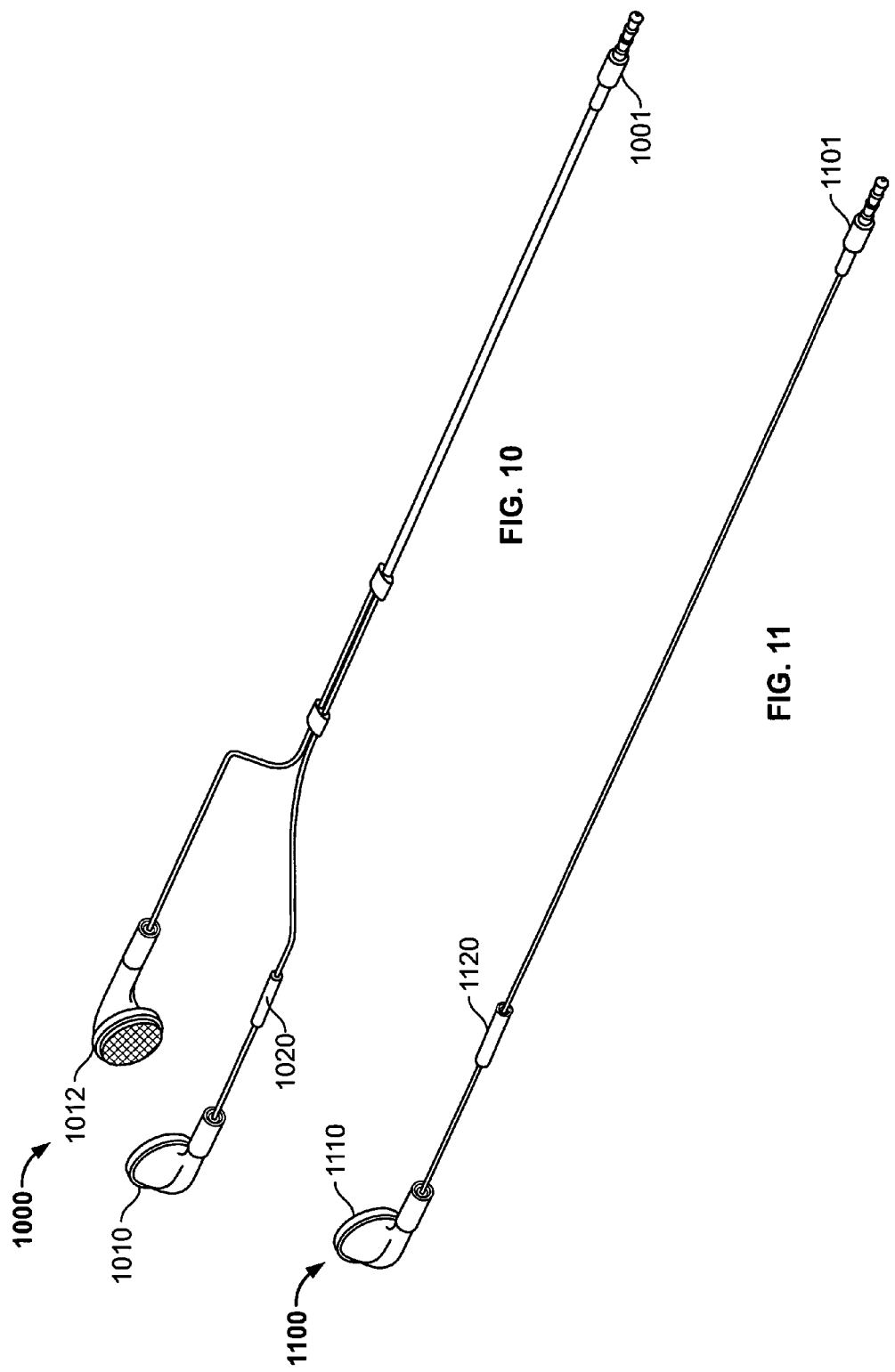

BEND SWITCH FOR WIRED HEADSET

BACKGROUND OF THE INVENTION

This invention is directed to a switch for electrical and electronic devices.

Electrical switches for controlling functions of electronic devices are well known in the art. For example, media or communication devices include switches that are used to activate particular functions of the device (e.g., on/off, play, select or volume switch). To provide control of functions at a location remote from the media or communication device, switches that are incorporated in wires attached to the device have been developed (e.g., switches in wired headsets plugged into an audio device with a jack). For example, a headset can include a wheeled switch for controlling the volume of music provided by a media device (e.g., a portable music player). As another example, a headset can include a plurality of buttons for controlling playback of music (e.g., play, next, last, fast forward and rewind buttons).

A drawback of such switches that have been implemented in headset wires is that they tend to be bulky and have limited control functions. There is a need, therefore, for a switch that can be incorporated in a wire, that features a small and unobtrusive profile, and that can control one or more device functions. There is also a need for the switch to be easy to use without requiring a user to look at the switch.

SUMMARY OF THE INVENTION

In accordance with the principles of the present invention, a bend switch that can be incorporated in a wire, that features a small and unobtrusive profile, and that can control one or more device functions is provided. Features for using the switch without requiring a user to look at the switch are also provided.

The switch of the present invention includes two substantially co-linear elongated bodies that have contact surfaces that oppose each other and that, in an open switch position, do not contact each other. The elongated bodies can be secured inside a sleeve to prevent undesired interferences with the switch and to provide an interface for a user to access or actuate the switch. To close the switch, the user can bend the elongated bodies relative to each other such that the contact surfaces of the elongated bodies come into contact. When contact is made, a signal can pass from one elongated body to the other by passing through the contact surfaces. Because the switch of the present invention is actuated by bending the elongated bodies with respect to each other, the switch will be referred to as a "bend switch" in the following discussion.

The switch can include a movable space member that is placed between the elongated bodies to maintain the contact surfaces of the elongated bodies a predetermined distance apart in the open switch position, while still allowing users to bend the elongated bodies relative to each other to close the switch. The movable space member may provide unlimited bending orientations, or may instead define several preferred and/or non-preferred bending orientations.

The contact surface of an elongated body may be partitioned to include several conductive portions, separated by an isolating or non-conductive material, that a user can selectively actuate. The portions of the contact surfaces can be distributed in the elongated bodies such that a particular portion is placed in contact with the opposing elongated body only when the user bends the elongated bodies relative to each other in a specific orientation.

A bend switch may combine elongated bodies with contact surfaces having several conductive portions and a movable space member having several preferred and/or non preferred orientations to assist the user in bending the switch in orientations that cause specific portions of a contact surface to come into contact with the opposing elongated body (e.g., associate a preferred bending orientation to each of the portions of a contact surface).

The movable space member can include one or more equilibrium positions for holding elongated bodies at specific angles and orientations with respect to each other. The movable space member can also include a potentiometer that varies the strength of a signal based on the angle at which the elongated bodies are bent relative to each other.

The bend switch can be used to control any suitable function of any suitable electronic device. Suitable electronic devices may include, for example, a computer, a media system, a portable media device (e.g., a portable music player such as an iPod), a cellular telephone, a personal media device which may include telephone communication and digital music player capabilities, or any other suitable device. Suitable functions can include, for example, microphone or speaker mute, volume control, media playback functions (e.g., next, previous, pause, play), dial, hang-up, and any other suitable function.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 10 is a perspective view of an implementation of a bend switch in a stereo headset in accordance with one embodiment of the present invention;

FIG. 11 is a perspective view of an implementation of a bend switch in a mono headset in accordance with one embodiment of the present invention;

DETAILED DESCRIPTION

In accordance with the present invention, a switch that is activated by bending portions of the switch is provided.

Figure 1:
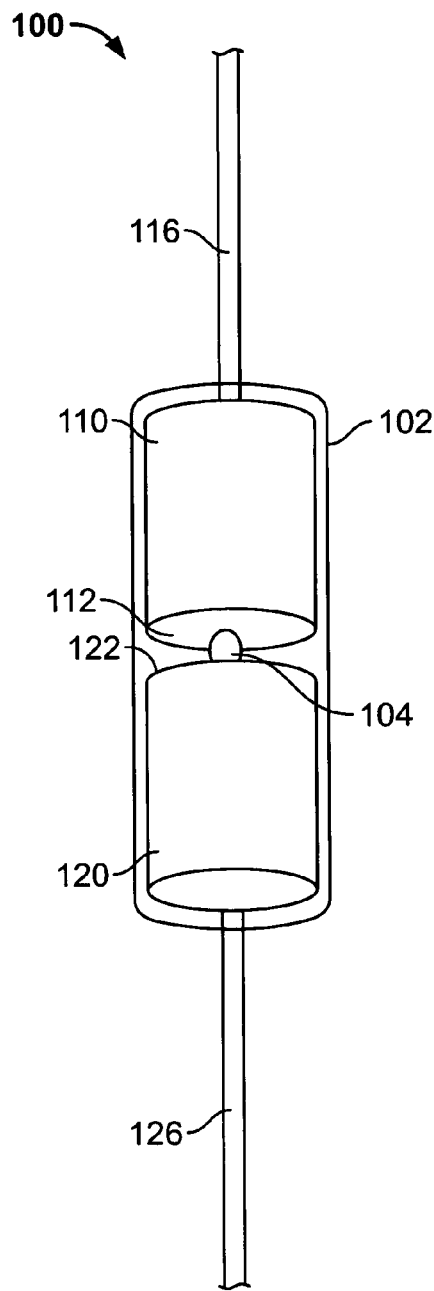
FIG. 1 is a perspective view of an illustrative bend switch in an open switch position in accordance with one embodiment of the present invention.

FIG. 1 shows a perspective view of an illustrative bend switch in an open switch position in accordance with the principles of the present invention. Illustrative bend switch 100 includes sleeve 102, first elongated body 110, and second elongated body 120. In the example shown in FIG. 1, elongated bodies 110 and 120 are cylindrical. It is understood that this is merely illustrative and that any other shape, including non-cylindrical and/or non-elongated shapes, can be used for the elongated bodies.

First and second elongated bodies 110 and 120 are placed substantially co-linearly in sleeve 102 such that contact surfaces 112 and 122 of the first and second elongated bodies, respectively, oppose each other, and when in an open switch position, do not contact each other. Switch 100 can be biased to remain in an open switch position unless external factors (e.g., a user's bending of at least elongated body 110 or 120) cause surfaces 112 and 122 to contact each other, thus closing the switch.

To maintain a normally open switch position, switch 100 can be constructed such that elongated bodies 110 and 120 are positioned a predetermined distance from each other within sleeve 102. The distance between elongated bodies 110 and 120 can be such that contact surfaces 112 and 122 do not touch when the elongated bodies are co-linear. To cause contact surfaces 112 and 122 to contact each other, a user can bend the switch (e.g., bend the elongated bodies towards each other).

In some embodiments, the predetermined distance can be maintained by placing elongated bodies 110 and 120 in a frictional or permanently fixed relationship with respect to sleeve 102. For example, sleeve 102 can be shrunk (e.g., shrunk-wrapped) around elongated bodies 110 and 120 such that bodies 110 and 120 are not normally in contact. As another example, the elongated bodies can be attached (e.g., using an adhesive or static cling) to sleeve 102 such that bodies 110 and 120 are not normally in contact. Sleeve 102 can be made from any suitable material including, for example, fabric, rubber, polymers, elastomers, plastic, thermoplastic, or any other suitable material.

Elongated bodies 110 and 120 can be coupled to wires 116 and 126, respectively, and are adapted to conduct signals from the wires to their respective contact surfaces 112 and 122. For example, elongated bodies 110 and 120 can be constructed from an electrically conductive material (e.g., a metal such as copper, silver, or gold, or a semiconductive material). As another example, contact surfaces 112 and 122 can be connected to wires 116 and 126, respectively, using a conductive or semiconductive element (e.g., a wire) incorporated in bodies 110 and 120.

In some embodiments, bend switch 100 can include movable space member 104 that is positioned between contact surfaces 112 and 122. Movable space member 104 may prevent elongated body 110 from coming into contact with elongated body 120 by maintaining bodies 110 and 120 a predetermined distance apart unless an external force is applied to close the switch. Movable space member 104 may be permanently fixed to one or both of bodies 110 and 120.

Movable space member 104 can be selected from an insulating material to ensure that no signal is passed through bodies 110 and 120 when switch 100 is in the open position. Movable space member 104 may be movable or bendable to permit electrical connections between contact surfaces 112 and 122. For example, movable space member 104 may be an elastomeric material that can bend in any suitable orientation to permit electrical contact between elongated bodies 110 and 120. As another example, movable space member 104 may be constructed to move in a "ball and socket" fashion, where one portion of movable space member 104 may have a ball portion movably retained in a socket portion of a first body (e.g., body 110) and a connector potion permanently fixed to a second body (e.g., body 120). During movement, the second body may pivot with respect to the first body to form an electrical connection between the first and second bodies. Other examples of movable space members 104 are discussed in more detail below in connection with the description accompanying FIGS. 4-7.

It is understood that in various embodiments, particularly those which include movable space member 104, sleeve 102 can be omitted. For example, movable space member 104 can be constructed to maintain bodies 110 and 120 in a normally open switch position without the assistance of any positional support that may otherwise be provided by sleeve 102.

Figure 2:
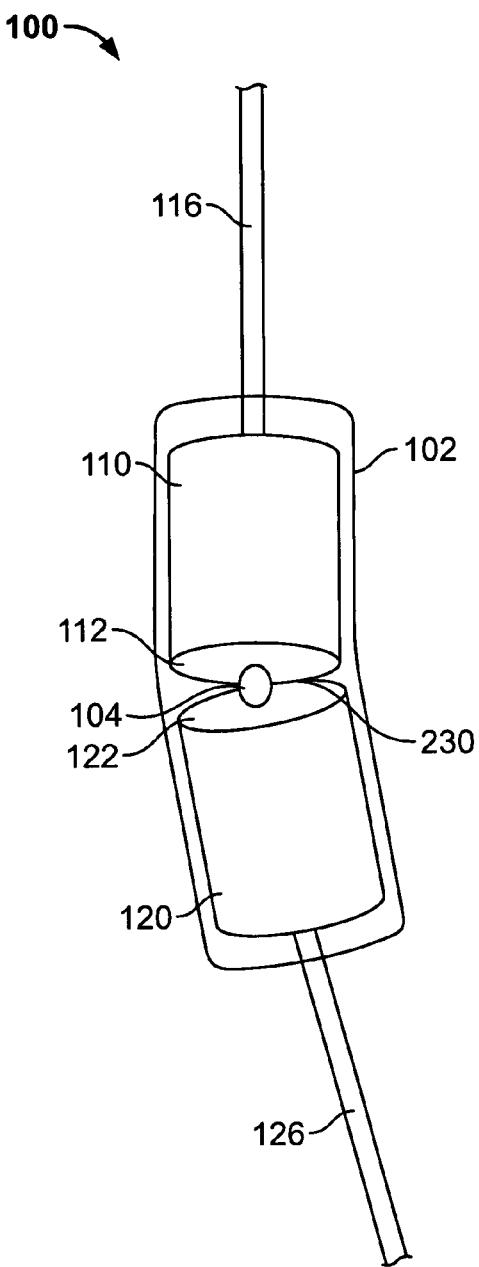
FIG. 2 is a perspective view of the bend switch of FIG. 1 in closed switch position in accordance with one embodiment of the present invention.

FIG. 2 shows a perspective view of bend switch 100 of FIG. 1 in a closed switch position in accordance with an embodiment of the invention. Switch 100 may be closed, for example, when a user bends elongated bodies 110 and 120 relative to each other such that a portion of contact surfaces 112 and 122 contact each other. As shown when switch 100 is closed, electrical coupling between bodies 110 and 120 may occur when contact surfaces 112 and 122 contact each other at, for example, contact point 230. In some embodiments, contact surfaces 112 and 122 may be angled (e.g., angled inward) to promote contact and electrical coupling. When contact surfaces 112 and 122 are placed in contact, signals may be provided from switch 100 to, for example, a personal media device (not shown), which may process the signal and perform a function in response to receiving that signal.

Bend switch 100 can be coupled to any suitable device (not shown) to control a function of the device. The device may be any suitable electronic device including, for example, a computer, media system, portable media device, cellular telephone, or any other suitable device. Software implemented on the device can control functions of the device in response to user issued instructions. In particular, the software can process signals received when bend switch 100 is placed in a closed switch position by detecting the presence of a signal in an input/output port in which the wire coupled with bend switch 100 is connected, and convert the processed signal into a software instruction that controls a function.

In some embodiments, the software can process different types of signals provided by bend switch 100 to control different device functions. For example, if the bend switch includes several conductive portions on a contact surface, as discussed below in connection with FIGS. 3A and 3B, different signals can be provided by each conductive portion when that conductive portion contacts the opposing elongated body. As another example, if the bend switch is open and closed repeatedly, providing a sequence of signals, the software implemented on the device can process the sequence of signals to control a function (e.g., increase or decrease volume).

Figure 3A:
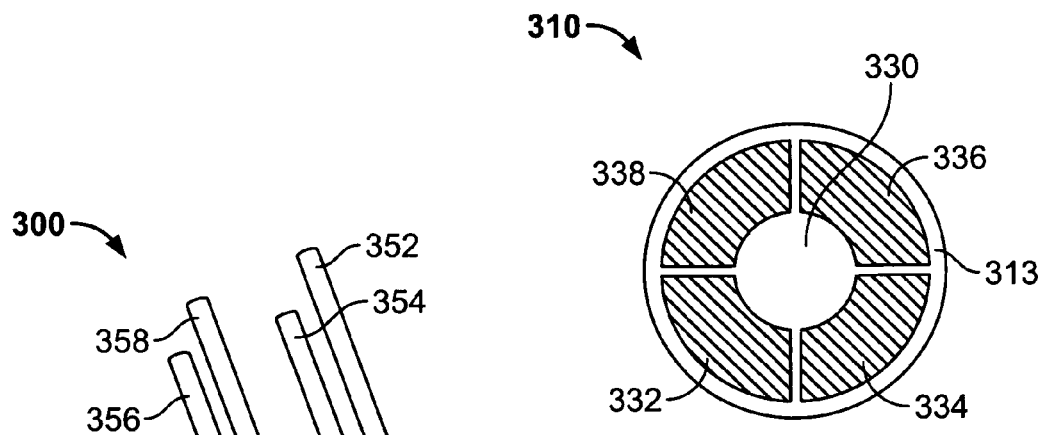
FIG. 3A is a schematic view of the inner surface of an elongated body of a bend switch that includes several contact surfaces in accordance with one embodiment of the present invention.

FIG. 3A shows a schematic view of contact surface 313 of elongated body 310 of a bend switch that includes several conductive portions in accordance with an embodiment of the invention. Conductive portions 332, 334, 336 and 338 of elongated body 310 are separated by isolating portion 330, which may be a portion of body 310 or a separate element of body 310. Conductive portions 332, 334, 336 and 338 can be constructed with any suitable conductive material such as, for example, gold, silver, copper or another metal, silicone or other semiconductive materials, or any other suitable conductive material. Isolating portion 330 can be constructed with any suitable isolating material such as, for example, rubber, polymers, elastomers, plastic, thermoplastic, or any other suitable isolating or non-conductive material.

Elongated body 310 can be constructed in any suitable manner. For example, elongated body 310 can be constructed by molding, stamping, extruding, casting, or machining (or any other suitable manufacturing process) non-conductive or isolating material to form cavities configured to receive conductive portions 332, 334, 336, and 338. As another example, elongated body 310 can be formed by introducing non-conductive isolating material around conductive portions 332, 334, 336 and 338 using, for example, an injection process, a dipping process, or any other suitable process.

Conductive portions 332, 334, 336 and 338 may be any suitable shape. For example, conductive portions 332, 334, 336 and 338 may be thin pads that are placed on or extend from contact surface 313. As another example, conductive portions 332, 334, 336 and 338 may be longer extruded shapes that extend from contact surface 313 into elongated body 310. In addition, conductive portions 332, 334, 336 and 338 may have any suitable cross-section. For example, the cross-section may be a portion of a disc, as shown in FIG. 3A. Conductive portions 332, 334, 336 and 338 may be positioned on or adjacent the perimeter of contact surface 313, and/or may be raised with respect to contact surface 313 and isolating portion 330 to facilitate closing the bend switch in response to the application of an external force.

A bend switch having an elongated portion such as elongated portion 310 can provide different signals depending on which conductive portion is placed in contact with the other elongated body. For example, each conductive portion may be connected to a separate wire that provides a particular signal to the device to which the switch is coupled (e.g., a personal media device). When a particular conductive portion is placed in contact with the opposing elongated body and an electrical coupling occurs, a signal may be provided through the wire associated with the particular conductive portions. The device coupled to the switch may process the signal received with the wire, and perform a function associated with that signal.

Figure 3B:
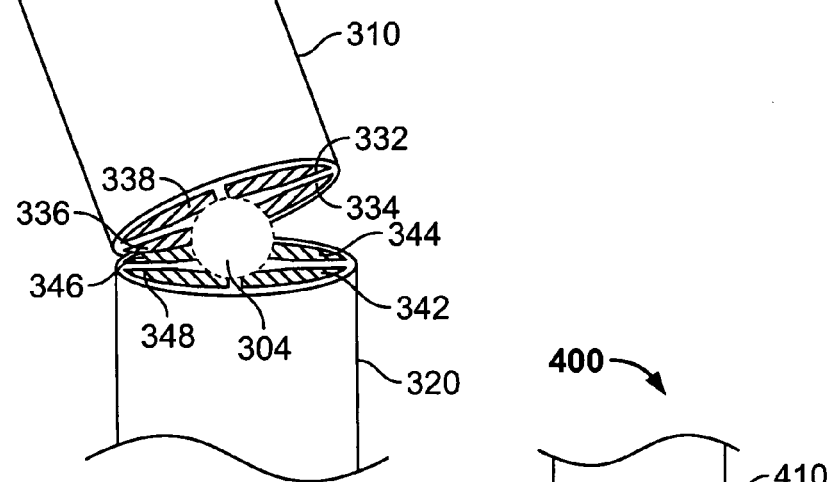
FIG. 3B is a perspective view of an illustrative bend switch that includes elongated portions that both have several contact surfaces in accordance with one embodiment of the present invention.

FIG. 3B shows a perspective view of illustrative bend switch 300 that includes elongated portions 310 and 320 that both have several conductive portions in accordance with an embodiment of the invention. In particular, in the example of FIG. 3B, elongated body 310 includes conductive portions 332, 334, 336 and 338, and elongated body 320 includes conductive portions 342, 344, 346 and 348. Each of the conductive portions can be connected to a separate wire that carries a separate signal when the conductive portion is placed in contact with the opposing elongated body. In the example shown in FIG. 3B, wires 352, 354, 356 and 358 are connected to conductive portions 332, 334, 336 and 338, respectively.

Assuming a user has bent bend switch 300 as shown, conductive portions 336 and 346 may be in contact with each other, while the other conductive portions of elongated bodies 310 and 320 are not. As a result of this contact, a signal associated with conductive portions 336 and 346 may be transmitted via wire 356 to a personal media device (not shown), thereby causing the function associated with those conductive portions to be performed.

In some embodiments, only one of elongated bodies 310 and 320 can include several conductive portions. For example, one elongated body can include a plurality of conductive portions that are each associated with particular functions, and the other elongated body can include a single contact surface. As another example, more than one conductive portion of a first elongated body can be placed in contact with a single contact surface of a second elongated body.

As discussed above in connection with FIG. 1, a movable space member may be included within a bend switch in accordance with an embodiment of the invention. Such members may serve several functions including, for example, maintaining the elongated bodies in an open switch position and providing preferred bend switch movement paths. Examples and functions that may be performed by such members are discussed in more detail in connection with FIGS. 4-6.

Figure 4:
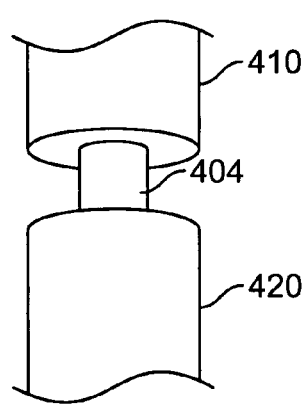
FIG. 4 is a perspective view of an illustrative bend switch that includes a movable space member that is placed between the elongated bodies of the switch and that is constructed to allow a full range of bending orientations in accordance with one embodiment of the present invention.

FIG. 4 shows a perspective view of illustrative bend switch 400 that includes movable space member 404 that is placed between elongated bodies 410 and 420 and is constructed to allow a full range of bending orientations. By concentrically aligning movable space member 404 with respect to elongated bodies 410 and 420, movable space member 404 can provide for omnidirectional movement of elongated body 410 with respect to elongated body 420. For example, movable space member 404 can include a ball and socket joint, a spring, a cylindrical body, an elastomeric member, or any other suitable component or components. In some embodiments, movable space member 404 may include one or more magnets that provide, for example, a restoring force to align the bend switch after bending.

Movable space member 404 may be constructed such that its cross-sectional area is less than that of elongated bodies 410 and 420. This can allow elongated bodies 410 and 420 to bend far enough in every orientation (360° bending) for contact surfaces of elongated bodies 410 and 420 to come into contact. For example, movable space member 404 may have a circular cross-section that has a diameter (and therefore an area) that is less than the diameter of the circular cross-section of elongated bodies 410 and 420. Movable space member 404 can be a shell (e.g., a hollow structure) to allow wires or other components to pass through bend switch 400 and to facilitate bending of movable space member 404.

Figure 5A:
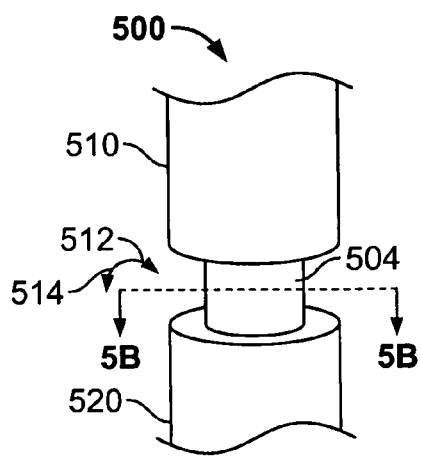
FIG. 5A is a perspective view of an illustrative bend switch including a movable space member having a preferred bending orientation in accordance with one embodiment of the present invention.
Figure 5B:
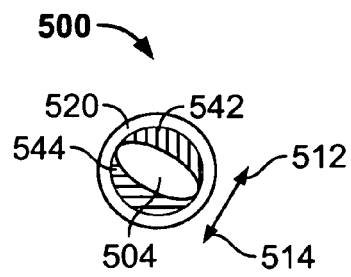
FIG. 5B is cross-section of the bend switch of FIG. 5A taken along lines 5B-5B of FIG. 5A in accordance with one embodiment of the present invention.

FIG. 5A shows a perspective view of illustrative bend switch 500 including movable space member 504 having a preferred bending orientation in accordance with an embodiment of the invention. As shown, movable space member 504 is placed between elongated bodies 510 and 520 and is constructed to influence or dictate preferred bending orientations as indicated by arrows 512 and 514. In one approach for providing preferred bending orientations, movable space member 504 may be a cylindrical movable space member having an elliptical cross-section, as shown in FIG. 5B. FIG. 5B shows a cross-section of switch 500 taken along lines 5B-5B of FIG. 5A. The long axis of the ellipse may be smaller than the diameter (or another representative distance) of elongated bodies 510 and 520, and the short axis of the ellipse may be substantially smaller than the diameter of elongated bodies 510 and 520. Such an arrangement results in a preferred bending orientation perpendicular to the long axis, also shown by arrows 512 and 514.

As another example, movable space member 504 may include a hinge. The hinge may be placed in between elongated bodies 510 and 520 such that the hinge allows elongated bodies 510 and 520 to rotate with respect to each other in the orientations identified by arrows 512 and 514. The hinge can be a pivot hinge, a continuous hinge, a concealed hinge, a living hinge, or any other suitable type of hinge. In some embodiments, the hinge may be an elastomer.

In some embodiments, movable space member 504 can be combined with elongated bodies having contact surfaces with several conductive portions such as that discussed above in connection with FIG. 3. An advantage of such members is that they may prevent users from simultaneously placing two or more conductive portions in contact. In FIG. 5B, elongated body 520 includes conductive portions 542 and 544, which are located on opposite sides of movable space member 504. When bend switch 500 is bent in the 512 direction, portion 542 of elongated body 520 may contact elongated body 510. Similarly, when bend switch 500 is bent in the 514 direction, portion 544 of elongated body 520 may contact elongated body 510. Because bend switch 500 is not constructed to permit easy bending in an orientation perpendicular to the short axis, a user may not (or at least may not easily) bend switch 500 such that both conductive portions 542 and 544 are simultaneously in contact with elongated body 510.

Figure 5C:
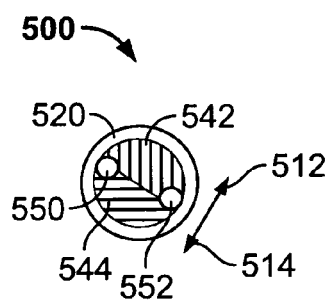
FIG. 5C is cross-section of another illustrative bend switch in accordance with one embodiment of the present invention.

In some embodiments, movable space member 504 can include a discreet number of posts that are distributed along the inner surfaces of elongated bodies 510 and 520 instead of a continuous structure (e.g., instead of a solid member having an elliptical cross-section). FIG. 5C shows a cross-section of another illustrative switch 500 in accordance with an embodiment of the invention, where the switch includes posts instead of elliptical movable space member 504. Posts 550 and 552 are placed at the ends of the long axis of the elliptical cross-section 504 of FIG. 5B. This may allow movable space member 504 to provide preferred bending orientations with less material, and therefore a lighter switch 500.

Movable space member 504 can include any other suitable design that is configured to provide for at least one preferred bending orientation. For example, movable space member 504 can include a cross-section that that provides three, four, or more preferred bending orientations. Such a cross-section may be, for example, a triangular cross-section (e.g., with three preferred bending orientations along lines perpendicular to the sides of the triangle) or a square/rectangular/trapezoidal cross-section (e.g., with four preferred bending orientations along lines perpendicular to the sides of the cross-section). The triangular or four-sided cross-section may be defined by a continuous shape or by a series of posts placed along the periphery of the shape.

Figure 6A:
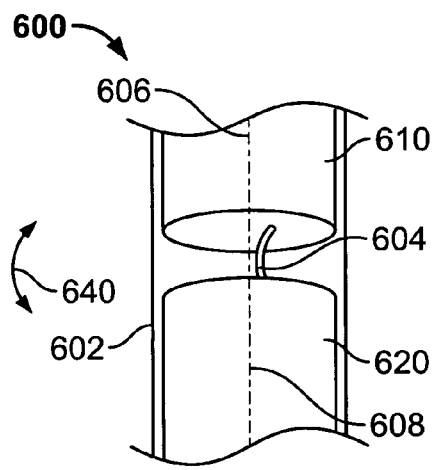
FIGS. 6A and 6B are perspective views of an illustrative bend switch including a movable space member that has two equilibrium positions in accordance with one embodiment of the present invention.

FIGS. 6A and B show perspective views of illustrative bend switch 600 including movable space member 604 that has two equilibrium positions (e.g., is bi-stable) in accordance with an embodiment of the invention. As shown, movable space member 604 is placed between elongated bodies 610 and 620 and is constructed to maintain elongated bodies 610 and 620 in one or more positions (e.g., equilibrium positions, such as the two buckled positions of a rod that is placed in compression between elongated bodies 610 and 620) with respect to each other in the absence of an external force on switch 600 (e.g., a user actuation of switch 600).

Movable space member 604 can apply a bending moment to at least one of elongated bodies 610 and 620 to hold elongated bodies 610 and 620 in a position such that the angle between center axis 606 of elongated body 610 and center axis 608 of elongated body 620 remains fixed in the absence of an external force. In the example of FIG. 6A, movable space member 604 is configured to maintain elongated bodies 610 and 620 in a position where the angle between center axes 606 and 608 is 0°, and in the example of FIG. 6B, movable space member 604 is configured to maintain elongated bodies 610 and 620 in a position where the angle between center axes 606 and 608 is θ.

Movable space member 604 can provide the bending moment in any suitable manner. In the example of FIGS. 6A and B, movable space member 604 is a rod that is offset from center axes 606 and 608 of elongated bodies 610 and 620, respectively. By placing movable space member 604 in an off-center position, movable space member 604 has leverage to apply a bending moment that forces elongated bodies 610 and 620 to maintain a position in which they remain co-linear and not in contact (e.g., an open switch position), as well as a position in which they are rotated with respect to each other around an axis that is perpendicular to both axis 606 and axis 608 (e.g., a closed switch position).

By its placement, movable space member 604 includes an inherent preferred bending orientation and an inherent non-preferred bending orientation. The existence of these inherent preferred and non-preferred bending orientations is related to the distance between movable space member 604 and the outer periphery of elongated bodies 610 and 620. In particular, to apply the same bending moment to at least one of elongated bodies 610 and 620, movable space member 604 may apply a larger force in the orientation where the distance between movable space member 604 and the outer periphery of elongated bodies 610 and 620 is smaller, and a smaller force in the orientation where the distance is larger. Thus, the preferred bending orientation is shown by arrows 642, and the non-preferred bending orientation is shown by arrows 640.

FIG. 6A shows switch 600 in an open switch position with movable space member 604 in a first equilibrium position that maintains the open switch position. Movable space member 604 may hold bend switch 600 open by applying a bending moment to elongated bodies 610 and 620 in the orientation indicated by arrows 640. The placement of movable space member 604 between axes 606 and 608 and the outer periphery of elongated bodies 610 and 620 may prevent movable space member 604 from forcing elongated bodies 610 and 620 to contact each other because achieving such contact may require a higher force to apply a sufficient bending moment than the force provided by movable space member 604 (e.g., because the distance between movable space member 604 and the periphery of elongated bodies 610 and 620 is shorter in the orientation identified by arrows 640).

Figure 6B:
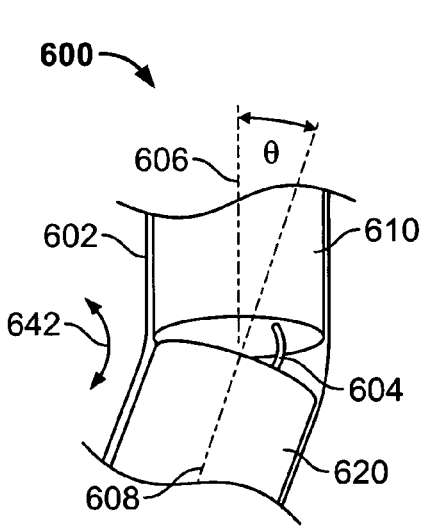

FIG. 6B shows switch 600 in a closed switch position with movable space member 604 in a second equilibrium position that maintains the closed switch position. Movable space member 604 may hold bend switch 600 closed by applying a bending moment to elongated bodies 610 and 620 in the orientation indicated by arrows 642. The placement of movable space member 604 between axes 606 and 608 and the outer periphery of elongated bodies 610 and 620 may facilitate maintaining elongated bodies 610 and 620 in contact because the force required to generate a sufficient bending moment is relatively low (e.g., because the distance between movable space member 604 and the periphery of elongated bodies 610 and 620 is longer in the orientation identified by arrows 640).

In some embodiments, movable space member 604 may include one or more magnets. The magnets may be positioned to provide an equilibrium position (e.g., keeping elongated bodies 610 and 620 aligned). For example, the magnets may be rings at or around (e.g., under) the periphery of elongated bodies 610 and 620. Once bend switch 600 is bent, the magnets may provide a magnetic force separating the portions of the magnets that were brought together, thus separating elongated bodies 610 and 620.

Movable space member 604 can have any suitable number of equilibrium positions, each of which can be associated with one or more preferred and non-preferred bending orientations. In addition, movable space member 604 can be combined with elongated bodies having contact surfaces that include several conductive portions such as those discussed above in connection with FIG. 3. An advantage of such members is that they may allow users to maintain particular conductive portions in contact, thus allowing users to maintain access to a function associated with that particular conductive portion.

Figure 7:
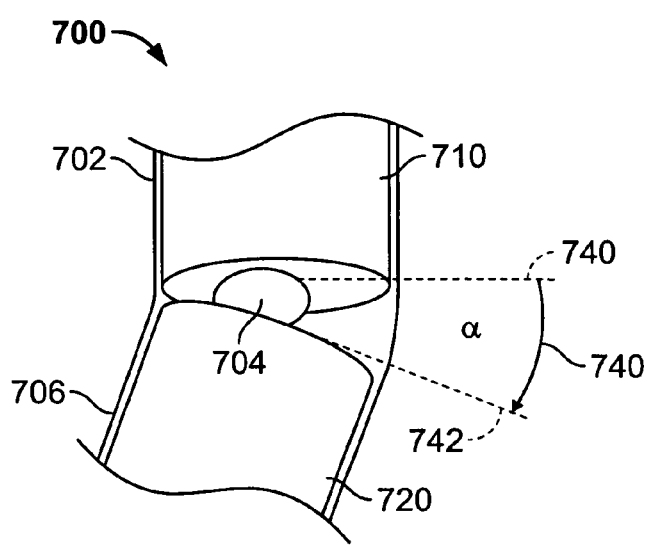
FIG. 7 is a perspective view of an illustrative bend switch that includes a potentiometer located between the elongated bodies of the switch in accordance with one embodiment of the present invention.

FIG. 7 shows a perspective view of illustrative bend switch 700 that includes potentiometer 704 located between elongated bodies 710 and 720 in accordance with an embodiment of the invention. Potentiometer 704 can vary the strength of the signal provided by bend switch 700 based on the degree to which elongated bodies 710 and 720 are bent with respect to each other. For example, the closer elongated bodies 710 and 720 are bent towards each other, the stronger the signal provided by bend switch 700. The strength of the signal may be directly correlated to angle α, which is a measurement of the angle from plane 740 defined by the inner surface of elongated body 710 to plane 742 defined by the contact surface of elongated body 712. By defining a as a directional angle, bend switch 700 may provide positive or negative signals based on the orientation in which elongated bodies 710 and 712 are bent with respect to each other. Each of the positive and negative signals may control a different function of a device (e.g., a portable media player) coupled to bend switch 700 (e.g., volume up and down). In some embodiments, the potentiometer can measure positive and negative voltage, based on the orientation in which the bend switch is bent. The polarity of the voltage can be used to activate different functions (e.g., volume up for positive voltage, and volume down for negative voltage).

In some embodiments, bend switch 700 can include several potentiometers 704 to control different functions using the same bend switch 700. For example, each potentiometer 704 may be associated with a different function, where the strength of the signal provided by each potentiometer 704, as measured by a bend angle α, can be processed by software on a device to set each of the different functions at a value (e.g., a particular volume) that corresponds to the bend angle α. This embodiment can be implemented, for example, to provide independent control of left and right audio channels using bend switch 700.

Bend switch 700 can also control different functions of a device (not shown) using a single potentiometer 704. The software implemented on the device can control several functions by assigning to each function a range of signal strengths. For example, the software may control a first function when the signal strength is between 1% and 33% of the maximum signal strength, a second function when the signal strength is between 34% and 66% of the maximum signal strength, and a third function when the signal strength is between 67% and 100% of the maximum signal strength. The user can access a particular function by bending elongated bodies 710 and 720 relative to each other at a bend angle α that corresponds to a signal strength that is within the range of the signal strengths associated with the particular function. Bend switch 700, or more specifically potentiometer 704, can include a component that provides tactile feedback (e.g., a clicking sound) that indicates to the user which function is controlled when elongated bodies 710 and 720 are bent relative to each other at bend angle α. As another example, a display screen on the device (e.g., the screen of a portable media device) can provide a visual indication of which function is currently controlled (e.g., by processing the signal and determining the range of the signal strength).

Using potentiometer 704, bend switch 700 can provide a range of signal strengths that, when processed by a device, correspond to a range of values of a function of the device. Functions that are defined over a range of values, and therefore be controlled by bend switch 700, may include, for example, volume (e.g., of speakers or a microphone), fast forward and rewind (e.g., at different rates), or any other suitable function. In some embodiments, potentiometer 704 can maintain elongated bodies 710 and 720 at one or more particular angles with respect to each other unless an external force is applied to bend switch 700.

In some embodiments, the bend switch may be configured to provide tactile feedback in response to an activation of the switch. For example, the movable space member of a switch may having a plurality of equilibrium positions may hold the switch at an angle that makes it clear to the user whether the switch is open or closed. As another example, the movable space member may extend from the periphery of the elongated bodies when the switch is in one of the open or closed positions.

In some embodiments, the bend switch may include a dome switch in the contact area. The dome switch may provide a tactile and/or auditive feedback when the bend switch is closed (e.g., closing the bend switch causes the dome switch to collapse, providing the tactile and/or auditive feedback). In some embodiments, the bend switch may include an actuator for providing feedback.

Figure 8:
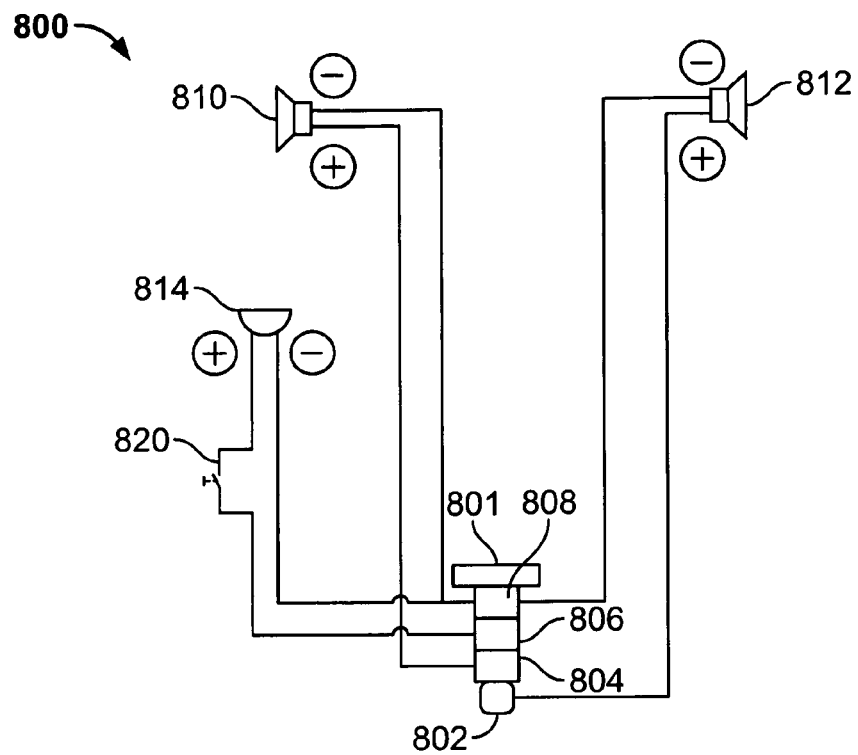
FIG. 8 is a circuit diagram for an analog circuit having a bend switch for toggling a microphone in accordance with one embodiment of the present invention.

FIG. 8 shows an illustrative circuit diagram for analog circuit 800 having bend switch 820 for toggling a microphone. Circuit 800 (and circuit 900, discussed below in connection with FIG. 9) can be implemented in any suitable electronic device such as, for example, in audio and/or video devices (e.g., a portable music player, such as an iPod), communications devices (e.g., a cellular telephone), personal media device which may include telephone communication and digital music player capabilities, or any other electronic device that can operate in connection with a switch. Circuit 800 will be described below in the context of a circuit coupled to a cellular telephone, but it will be understood that this is merely illustrative and that circuit 800 can be coupled to any other suitable device.

Circuit 800 includes jack 801, right channel speaker 810, left channel speaker 812, and microphone 814 that can be activated by bend switch 820. Jack 801, which is plugged into a cellular telephone (not shown), includes four sections: left channel section 802, right channel section 804, microphone section 806, and ground section 808. Wires connect right channel speaker 810 to right channel section 804 and ground section 808, left channel speaker 812 to left channel section 802 and ground 808, and microphone 814 to microphone section 806 and ground 808 via bend switch 820. In some embodiments, bend switch 820 can be coupled to each of the wires connecting microphone 814 to jack 801 (not shown).

The cellular telephone coupled to circuit 800 can respond to signals that are provided by switch 820 in any suitable manner. For example, when bend switch 820 is in a closed switch position, software implemented on the cellular telephone may detect the presence of a signal provided through microphone section 806 of jack 801. The software may process the signal and determine that microphone 814 has been activated. The cellular telephone can then transmit the sounds (e.g. the voices) picked up by microphone 814 over the cellular connection to another cellular telephone. As another example, when bend switch 820 is in the open switch position, the software implemented on the cellular telephone may determine that no signals are received in microphone section 814 and turn off the microphone function of the cellular telephone. A more detailed description of how the cellular telephone responds to actuation of a switch can be found in commonly assigned U.S. Patent Application Publication No. 2008/0149417, published on Jun. 26, 2008, which is incorporated by reference herein in its entirety.

Figure 9:
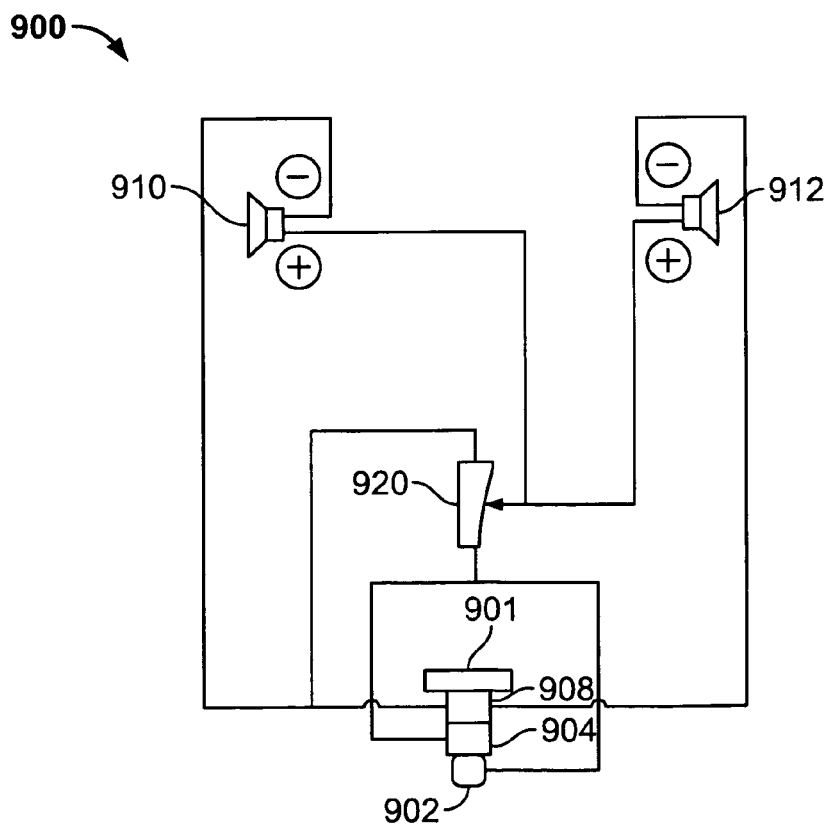
FIG. 9 is a circuit diagram for an analog circuit having a bend switch with a potentiometer for controlling volume in accordance with embodiments of the present invention.

FIG. 9 shows a circuit diagram for analog circuit 900 having a bend switch with potentiometer 920 for controlling volume in accordance with an embodiment of this invention. Circuit 900 will be described below in the context of a circuit coupled to a portable media device, but it will be understood that this is merely illustrative and that circuit 900 can be coupled to any other suitable device.

Circuit 900 includes jack 901, right channel speaker 910 and left channel speaker 912. Jack 901 includes three sections, left channel section 902, right channel section 904 and ground section 908. Wires connect right channel section 904 and left channel section 902 to potentiometer 920. Wires connect the output of potentiometer 920 to right channel speaker 910 and left channel speaker 912.

The portable media device coupled to circuit 900 can modify the volume of audio output to speakers 910 and 912 in response to the strength of the signal provided by potentiometer 920. For example, as a user bends the elongated bodies of a switch that includes potentiometer 920, the magnitude of the signal that passes across the bend switch may increase. Software implemented on the portable media device may process the signal provided by potentiometer 920, determine that the magnitude of the signal has increased, and cause the portable media device to increase the volume of audio that is output to speakers 910 and 912. In some embodiments, potentiometer 920 may remain in a bent position (e.g., to maintain a constant signal strength and associated volume level).

In the example shown in FIG. 9, a single potentiometer 920 is used to simultaneously control the volume of both right channel speaker 910 and left channel speaker 912. In some embodiments, the circuit can include two potentiometers, one for each channel (or any other suitable number of potentiometers 920). The two potentiometers can be provided as part of the same bend switch, or the two potentiometers can be provided in two bend switches.

In some embodiments, the microphones of circuits 800 and 900, and other suitable circuits, may remain electrically coupled to the electronic device to which the switch is connected independently of the state of the switch. Software on the electronic device may activate or de-activate the microphone input in response to a signal from the user. For example, the user may bend the switch to send a first signal activating the microphone (e.g., to receive a telephone call). The switch may be configured to automatically return to an open position (i.e., no signals provided by the switch to the electronic device) after the switch has been closed and released (e.g., using magnets or another movable space member). The user may then bend the switch a second time, sending a second signal (e.g., over the same wires as the first signal) to the electronic device. Software on the electronic device may then process the signal, and de-activate the active microphone.

FIGS. 10 and 11 show perspective views of illustrative wired headsets 1000 and 1100, respectively, that include bend switches 1020 and 1120, respectively. FIG. 10 shows a perspective view of illustrative stereo headset 1000 that includes jack 1001, right channel speaker 1010 and left channel speaker 1012. Bend switch 1020 is incorporated in the wire connected to right channel speaker 1010. FIG. 11 shows a perspective view of illustrative mono headset 1100 that includes jack 1101 and speaker 1110. Bend switch 1120 is incorporated in the wire connected to speaker 1110.

The placement of bend switches 1020 and 1120 in FIGS. 10 and 11 is merely illustrative, and the bend switches can be placed at any other suitable position in the wires of headsets 1000 and 1100. In addition, bend switches 1020 and 1120 may control any suitable function. For example, bend switches 1020 and 1120 can incorporate a microphone that is turned on or muted by bending bend switch 1020 or 1120 to place it in the closed switch position or open switch position, respectively. Such illustrative bend switches are discussed in more detail in FIGS. 12 and 13.

Figure 12:
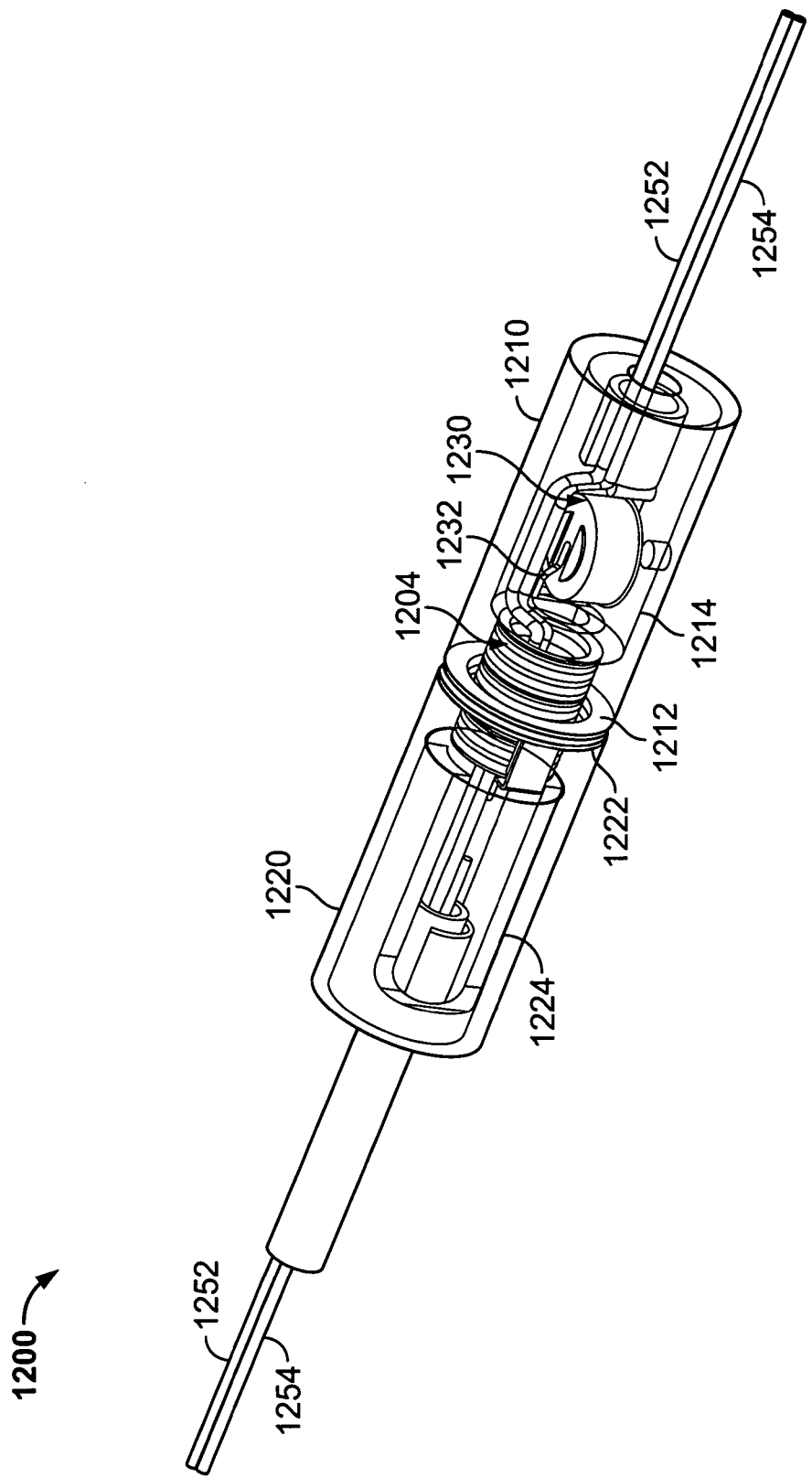
FIG. 12 is a perspective view of an illustrative bend switch that incorporates a microphone in accordance with one embodiment of the present invention.
Figure 13:
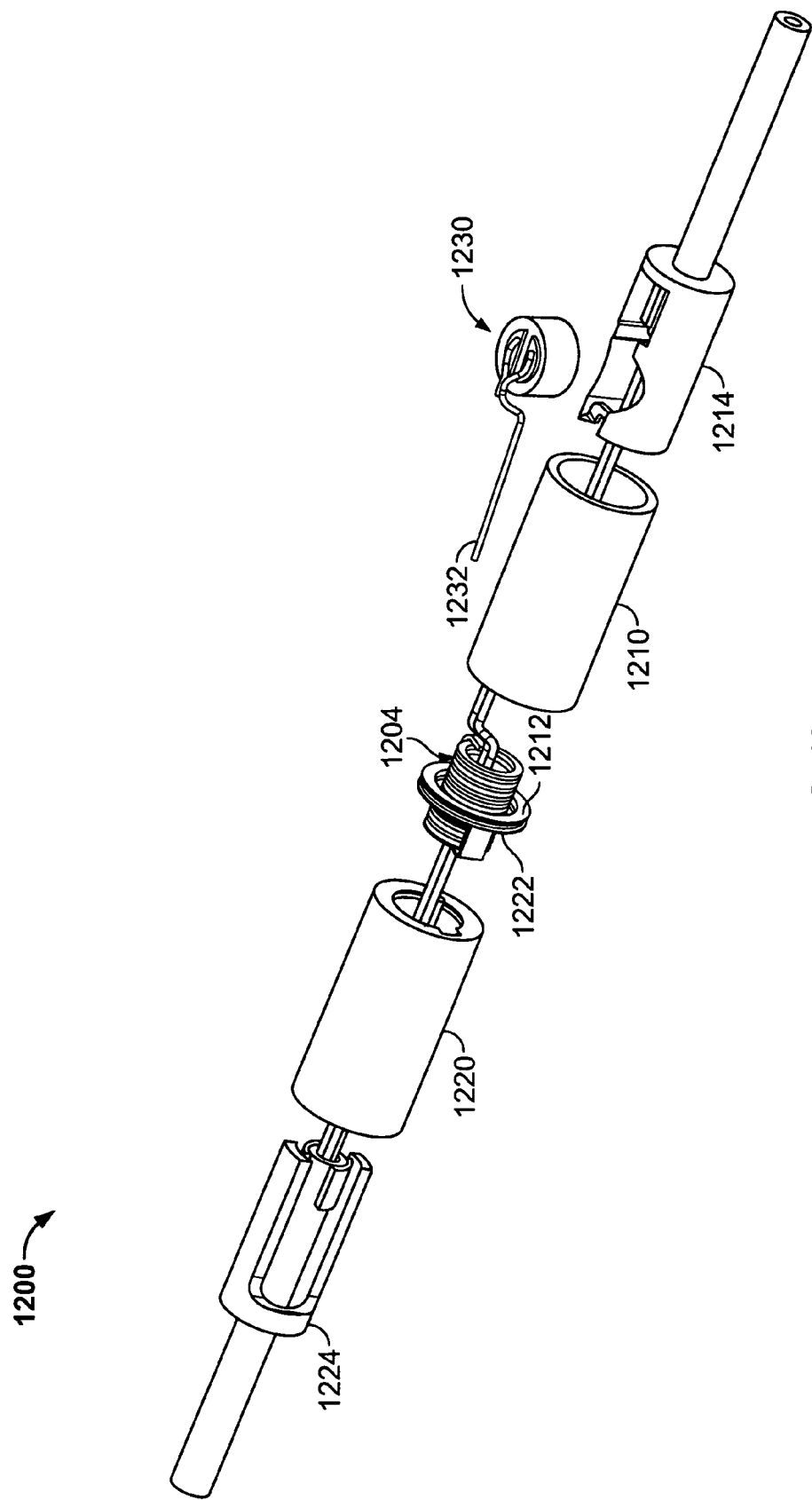
FIG. 13 is an exploded view of the illustrative bend switch of FIG. 12 in accordance with one embodiment of the present invention.

FIG. 12 is a perspective view of illustrative bend switch 1200 that incorporates microphone 1230 in accordance with the invention, and FIG. 13 is an exploded view of bend switch 1200 of FIG. 12 in accordance with the invention. Bend switch 1200 includes first elongated body 1210 and second elongated body 1220 that are placed substantially co-linearly such that respective contact surfaces 1212 and 1222 oppose each other and, when in an open switch position, no contact exists between surfaces 1212 and 1222. Spring 1204 serves as a movable space member that maintains elongated bodies 1210 and 1220 apart when the switch is in an open switch position.

Elongated bodies 1210 and 1220 include inner structures 1214 and 1224, respectively, that support wires 1252 and 1254. Wires 1252 and 1254 can pass through bend switch 1200 without being affected by bend switch 1200. Inner structures 1214 and 1224, and spring 1204 can be constructed with an aperture that extends through structures 1214 and 1224 and spring 1204 for receiving wires 1252 and 1254. For example, wires 1252 and 1254 provide left and right stereo audio, and bend switch 1200 controls the activation of microphone 1230.

Inner structure 1214 can receive microphone 1230 (e.g., in a cavity), the operation of which can be controlled by the bend switch. Microphone 1230 is coupled to contact surface 1212 using wires 1232, which may couple the positive and negative poles of microphone 1230 to contact surface 1212 (e.g., two wire strands shown coupled to microphone 1230 in FIG. 13). To activate the microphone, it may be necessary to close the circuit that includes microphone 1230 and wires 1232. To do so, a user may bend elongated bodies 1210 and 1220 relative to each other such that contact portions 1212 and 1222 meet and electrical coupling occurs. A signal may then be passed from wires 1232 to opposing contact portion 1222, which may in turn pass the signal to an electronic device (e.g., a cellular telephone). Contact portion 1222 may transmit the signal generated by closing bend switch 1200 in any suitable manner including, for example, using one of wires 1252 or 1254 (e.g., if one of wires 1252 and 1254 is coupled to contact portion 1222), or using a separate wire dedicated to microphone 1230 and coupled to contact surface 1222 (not shown).

The above described embodiments of the present invention are presented for purposes of illustration and not of limitation, and the present invention is limited only by the claims which follow.

What is claimed is:

1. A bend switch comprising:
 a first elongated body having a contact surface;
 a second elongated body having a contact surface, wherein the first and second elongated bodies are substantially co-linear and disposed a predetermined distance apart from each other, and the contact surfaces of the first and second bodies oppose each other; and
 a movable space member placed between the first and second elongated bodies and operative to maintain the predetermined distance;
 wherein at least one of the elongated bodies is operative to bend with respect to the other elongated body such that the contact surface of the first elongated body contacts the contact surface of the second elongated body to form an electrical coupling.

2. The bend switch of claim 1, wherein a contact surface of at least one of the first and second elongated bodies comprises at least two conductive portions.

3. The bend switch of claim 1, wherein the movable space member comprises at least one preferred bending orientation.

4. The bend switch of claim 1, wherein the movable space member comprises at least one non-preferred bending orientation.

5. The bend switch of claim 1, wherein the movable space member is operative to bend when the first and second elongated bodies are bent with respect to each other.

6. The bend switch of claim 5, wherein the movable space member comprises at least one equilibrium position.

7. The bend switch of claim 6, wherein the at least one equilibrium position comprises a closed switch position.

8. The bend switch of claim 1, wherein the movable space member comprises at least one potentiometer.

9. The bend switch of claim 1 further comprising a sleeve, wherein the first and second elongated bodies are enclosed in the sleeve.

10. The bend switch of claim 9, wherein the first and second elongated bodies are secured to the sleeve.

11. The bend switch of claim 1, further comprising a microphone.

12. A system comprising:
 a personal media device; and
 a headset electrically coupled to the personal media device, the headset comprising a bend switch operative to execute at least one personal media device function, wherein the bend switch further comprises:
  a first cylindrical elongated body including a contact surface at an end of the first cylindrical elongated body; and
  a second cylindrical elongated body including a contact surface at an end of the second cylindrical elongated body, wherein the first and second elongated bodies are substantially end-to-end and disposed a predetermined distance apart from each other, and the contact surfaces of the first and second bodies oppose each other, wherein at least one of the elongated bodies is operative to bend with respect to the other elongated body to close an electrical circuit.

13. The system of claim 12, wherein at least one of the elongated bodies is operative to bend with respect to the other elongated body such that the contact surface of the first elongated body forms an electrical coupling with the contact surface of the second elongated body.

14. The system of claim 13, wherein the contact surface of at least one of the first and second elongated bodies comprises at least two conductive portions.

15. The system of claim 14, wherein each of the at least two conductive portions is operative to execute a different personal media device function.

16. The system of claim 13, wherein the bend switch comprises a movable space member placed between the first and second elongated bodies and operative to maintain the predetermined distance.

17. The system of claim 12, further comprising a wire coupling the headset to the personal media device.

18. The system of claim 12, wherein the bend switch further comprises a microphone.

19. The system of claim 12, wherein the at least one personal media device function is one of a telephony function, an audio control function, and a media playback control function.

20. The system of claim 19, wherein the telephony function is one of mute, unmute, increase volume, decrease volume, dial, and end call.

21. The system of claim 12, wherein the personal media device is one of a personal audio device, a personal video device, a cellular telephone, and a combination thereof.

22. A method for using a bend switch comprising first and second co-linearly aligned elongated bodies each including a contact surface, the method comprising:
 bending at least one of the elongated bodies with respect to the other elongated body to form an electrical coupling by physically contacting the contact surfaces of the first and second elongated bodies;
 monitoring a bend angle between the first and second elongated bodies; and
 providing a signal based on the monitored bend angle.

23. The method of claim 22 further comprising bending at least one of the elongated bodies with respect to the other to break the physical contact between the contact surfaces of the first and second elongated bodies.

24. The method of claim 23 further comprising switching between an open switch position in which the contact surfaces of the first and second elongated bodies are not physically in contact and a closed switch position in which contact surfaces of the first and second elongated bodies are physically in contact.

25. The method of claim 24, wherein the bend switch is biased to remain in at least one of the open switch position and the closed switch position.

26. The method of claim 25, wherein the bend switch is configured to remain in at least one of the open switch position and closed switch position until an external force is applied to the bend switch.

27. The method of claim 22, further comprising executing a function of an electronic device coupled to the bend switch.

28. The method of claim 22, wherein the contact surface of at least one of the first and second elongated bodies comprises at least two conductive portions, each of which is associated with a function of an electronic device coupled to the bend switch.

29. The method of claim 28, further comprising permitting only one of the at least two conductive portions of the contact surface of the first elongated body to contact the contact surface of the second elongated body.

30. The method of claim 22, further comprising restricting the bending movement of at least one elongated body to at least one predetermined orientation.

* * * * *